US009702716B2

(12) United States Patent
Siegel et al.

(10) Patent No.: US 9,702,716 B2
(45) Date of Patent: Jul. 11, 2017

(54) TRAFFIC SCORE DETERMINATION

(71) Applicant: HTI, IP, L.L.C., Arlington, VA (US)

(72) Inventors: Robert Siegel, Marietta, GA (US);
James Barfield, Jr., Atlanta, GA (US)

(73) Assignee: Verizon Telematics Inc., Atlanta, GA (US)

( * ) Notice: Subject to any disclaimer, the term of this patent is extended or adjusted under 35 U.S.C. 154(b) by 192 days.

(21) Appl. No.: 14/012,291

(22) Filed: Aug. 28, 2013

(65) Prior Publication Data

US 2015/0066355 A1   Mar. 5, 2015

(51) Int. Cl.
*G01C 21/34* (2006.01)
*G01C 21/36* (2006.01)

(52) U.S. Cl.
CPC ..... *G01C 21/3446* (2013.01); *G01C 21/3461* (2013.01); *G01C 21/3492* (2013.01); *G01C 21/367* (2013.01)

(58) Field of Classification Search
CPC G01C 21/34; G01C 21/3446; G01C 21/3453; G01C 21/3469; G01C 21/3484; G01C 21/3492; G01C 21/3461; G01C 21/367; G01C 21/3415; G01C 21/3691; G08G 1/0112; G08G 1/096811
See application file for complete search history.

(56) References Cited

U.S. PATENT DOCUMENTS

| | | | | |
|---|---|---|---|---|
| 7,512,487 | B1* | 3/2009 | Golding | G01C 21/36 |
| | | | | 701/424 |
| 7,680,749 | B1* | 3/2010 | Golding | G01C 21/3484 |
| | | | | 706/14 |
| 9,297,663 | B1* | 3/2016 | Golding | G01C 21/3484 |
| 9,299,251 | B2* | 3/2016 | Scofield | G01C 21/3492 |
| 2002/0120390 | A1* | 8/2002 | Bullock | G08G 1/096716 |
| | | | | 701/117 |
| 2006/0122846 | A1* | 6/2006 | Burr | G01C 21/3492 |
| | | | | 342/357.31 |
| 2007/0208496 | A1* | 9/2007 | Downs | G08G 1/0112 |
| | | | | 701/117 |
| 2007/0299599 | A1* | 12/2007 | Letchner et al. | 701/200 |
| 2008/0262717 | A1* | 10/2008 | Ettinger | G01C 21/3476 |
| | | | | 701/467 |
| 2009/0210142 | A1* | 8/2009 | Couckuyt et al. | 701/200 |

(Continued)

*Primary Examiner* — Thomas G Black
*Assistant Examiner* — Sze-Hon Kong (57) ABSTRACT

A computing device may execute a routing application to perform operations including identifying a contextual parameter indicative of a quality preference for routing over segments of geographic mapping data, weighing the segments of geographic mapping data according to traffic score information indicative of the presence of the contextual parameter over the respective segments determined based at least in part on vehicle diagnostic data, and determining a suggested route for a vehicle from a current location to a destination location over the weighed segments of geographic mapping data based on the contextual parameter. The device may be further configured to receive a route request including the destination location for the vehicle; and display the route for the vehicle on a map including indications of the quality of the segments along the suggested route. To improve the routing, learning heuristics identify what diagnostic data variables correlate with presence of which contextual parameters.

20 Claims, 7 Drawing Sheets

(56) References Cited

U.S. PATENT DOCUMENTS

| | | | |
|---|---|---|---|
| 2009/0228196 A1* | 9/2009 | Raab | 701/200 |
| 2010/0030740 A1* | 2/2010 | Higgins | G06F 17/30241 715/762 |
| 2010/0228471 A1* | 9/2010 | Nagase | G01C 21/3492 701/532 |
| 2011/0137551 A1* | 6/2011 | Peri | 701/201 |
| 2011/0153191 A1* | 6/2011 | Dhanani | 701/201 |
| 2011/0238457 A1* | 9/2011 | Mason et al. | 705/7.14 |
| 2011/0251782 A1* | 10/2011 | Perkins et al. | 701/123 |
| 2012/0016576 A1* | 1/2012 | Huang et al. | 701/200 |
| 2012/0253661 A1* | 10/2012 | Tuukkanen | G01C 21/3492 701/423 |
| 2012/0303392 A1* | 11/2012 | Depura | H04W 52/0258 705/4 |
| 2013/0046526 A1* | 2/2013 | Yucel | G01C 21/3469 703/8 |
| 2013/0054141 A1* | 2/2013 | Paluszek | G01C 21/3617 701/488 |
| 2013/0132434 A1* | 5/2013 | Scofield | G08G 1/0112 707/771 |
| 2013/0173153 A1* | 7/2013 | Hayashida | G08G 1/0112 701/527 |
| 2013/0173155 A1* | 7/2013 | Fino | G01C 21/20 701/533 |
| 2013/0218445 A1* | 8/2013 | Basir | G08G 1/00 701/117 |
| 2013/0253833 A1* | 9/2013 | Tuukkanen | G01C 21/26 701/538 |
| 2014/0032087 A1* | 1/2014 | Shiri et al. | 701/117 |
| 2014/0046595 A1* | 2/2014 | Segawa | G01C 21/34 701/541 |
| 2014/0095059 A1* | 4/2014 | Kandal | G08G 1/00 701/119 |
| 2014/0222330 A1* | 8/2014 | Kohlenberg et al. | 701/425 |
| 2014/0229101 A1* | 8/2014 | Glaser et al. | 701/487 |
| 2014/0257693 A1* | 9/2014 | Ehlers | 701/522 |
| 2014/0278032 A1* | 9/2014 | Scofield | G01C 21/3492 701/118 |
| 2014/0303892 A1* | 10/2014 | Morlock | G01C 21/20 701/533 |
| 2014/0322676 A1* | 10/2014 | Raman | G09B 19/167 434/65 |
| 2014/0358437 A1* | 12/2014 | Fletcher | 701/533 |
| 2015/0051829 A1* | 2/2015 | Gearhart et al. | 701/467 |
| 2015/0057881 A1* | 2/2015 | Raab et al. | 701/36 |
| 2016/0047664 A1* | 2/2016 | Nishida | G01C 21/3469 701/537 |
| 2016/0076896 A1* | 3/2016 | Konig | G01C 21/26 701/411 |

* cited by examiner

TRAFFIC SCORE DETERMINATION

BACKGROUND

Mapping systems, such as GPS-based navigation systems included in motor vehicles, may include routing applications used to plan routes to one or more destination locations. The routing application may use geographic mapping data to determine appropriate routes to the locations. Such routing is often performed using a shortest-distance methodology, in which the routing application analyzes the mapping data, and recommends a route that is the shortest distance between a starting location and a destination location. In some cases, the routing application may take other factors into account, such as preference by the driver to avoid highways or left turns. However, routing applications are generally limited in their ability to consider other information, and may select routes that are very different from routes selected by drivers based on their experience and knowledge.

DETAILED DESCRIPTION

An improved mapping system may be configured to receive on-board diagnostic data from vehicles traveling along road segments, as well as user feedback from vehicle occupants indicative of aspects of the travel along the road segments. The mapping system may be further configured to use various heuristics to identify which variables from the on-board diagnostic data are correlated with what aspects of the route. For example, vehicles may train the mapping system by traversing a plurality of routes, and informing the system of which routes have what characteristics. The mapping system may receive various parameters from the vehicles, including data from on-board diagnostic information, and may identify inferred relationships in the data regarding which parameters are correlated with the characteristics.

For instance, the system may receive user feedback that that certain routes are hilly, and may identify that certain data patterns in engine revolutions correlate well with hilly conditions. As another example, the mapping system may be configured to utilize on-board diagnostics data received from multiple vehicles along road segments at the same approximate time to identify the quality of travel along the segments of roadway. For example, the mapping system may use the on-board diagnostics data to identify patterns in the on-board diagnostic data that correlate with wave patterns that develop in congested areas caused by vehicles slowing or stopping on congested roadways. Identification of these patterns in a road segment may also be used to inform a determination of a traffic flow score for traffic over the corresponding segment.

To receive the on-board diagnostic data, the system may include devices connected to vehicle data ports (e.g., OBD-II port dongles with wireless capability) that capture and transmit vehicle data (e.g., vehicle speed, vehicle stops, and length of stops) for use by the system. As another example, the on-board diagnostic data may be received from telematics units offered as original equipment on many vehicles.

Additional sources of information may also be used to inform the model used for determination of traffic flow scores. As some examples, traffic flow score may be additionally modeled and determined according to a combination of weather forecasts, traffic information received from roadway cameras or loops, reports from traffic observers or traffic management authorities, road segment mapping information, and network information indicative of the positioning of network devices connected to a communications network.

The traffic scores may be overlaid on a navigation roadmap display. Exemplary displays may include a user interface presented by a smartphone application executed by a mobile device, a web page viewed by an Internet-connected device, or a screen of a vehicle navigation unit. As one example, the traffic scores may rank the traffic flow over the corresponding segments (e.g., on a scale of 1-100 where 100 is clear travel and 1 is impassable). Accordingly, the determined traffic scores may provide a user with an understanding of the quality of vehicular traffic for segments of roadway along a route, beyond a simple measure of the speed of vehicle travel.

Moreover, the improved traffic score may be used to improve the routing of vehicles to destination locations. To do so, the system may be configured to receive a user specification of one or more contextual route quality parameters along with a destination location to reach. As one possibility, the contextual parameters may allow a user to specify a minimum traffic score indicative of a minimum comfort level for the route to factor into the determination of the recommended route to the destination location. As another example, the system may allow the user to specify contextual parameters requesting a more scenic route despite the possibility of the scenic route being suboptimal in other ways, such as being longer or slower to the destination. Based on the received contextual parameters, the system may be configured to plan a customized route for the user.

Figure 1:
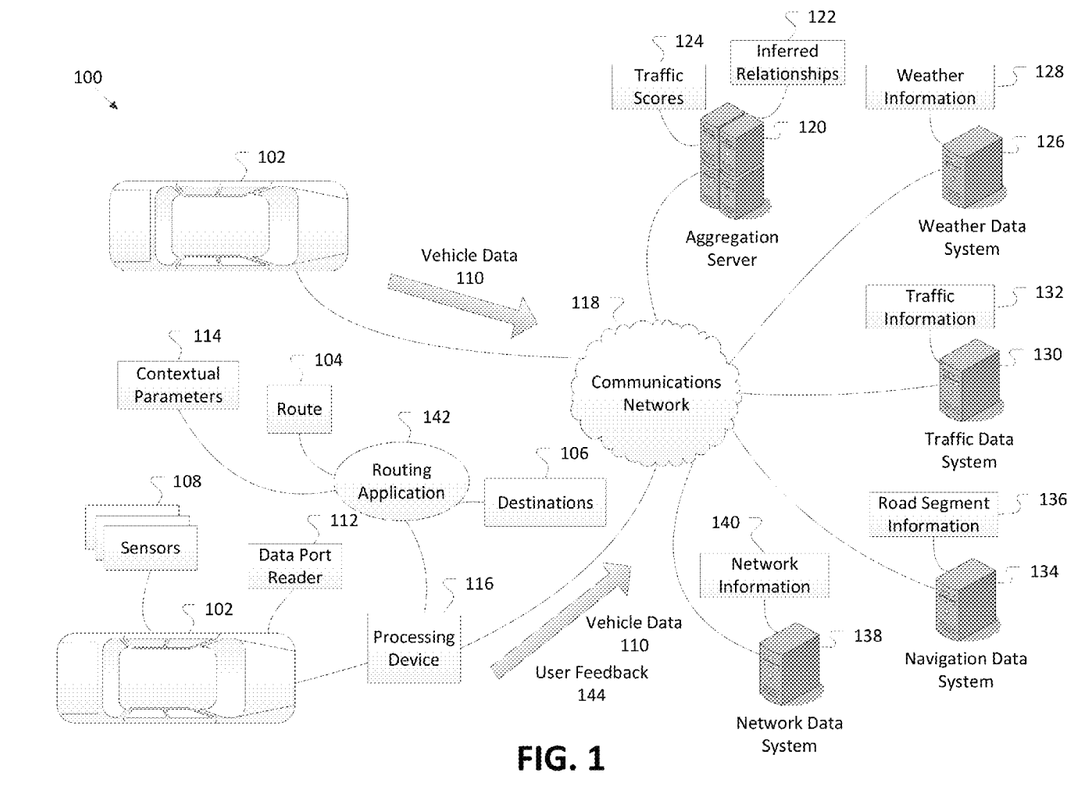
FIG. 1 illustrates an exemplary system for providing an improved route utilizing traffic scores.

FIG. 1 illustrates an exemplary system 100 for providing an improved route 104 utilizing traffic scores 124. As shown, the system 100 includes one or more vehicles 102 configured to communicate over a communications network 118. Each vehicle 102 may include or be in communication with a plurality of vehicle sensors 108 that may provide vehicle data 110 to other systems via a vehicle data port reader 112. The communications network 118 may also be in communication with an aggregation server 120 configured to receive information from the vehicles 102 that traverse road segments (e.g., via the data port readers 112 of the vehicles 102) as well as user-entered contextual parameters 114 regarding aspects of quality of travel over the traversed road segments. The aggregation server 120 may use this and other received information to determine inferred relationships 122 in the received information and compile traffic scores 124. The communications network 118 may further be connected to various other information systems, including a weather data system 126, a traffic data system 130, a navigation data system 134 and a network data system 138 to further aid in the determination of the traffic scores 124. The vehicle 102 may also include a processing device 116 in communication with the communications network 118 and configured to execute a routing application 142. The routing application 142 may be configured to determine a vehicle route 104, based on the traffic scores 124, destination information 106, as well as one or more entered contextual parameters 114. The routing application 142 may be further configured to provide user feedback 144 to the aggregation server 120 to provide information to the aggregation server 120 indicative of whether the determined route 104 conformed to the entered contextual parameters 114. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

Vehicles 102 may be any type of transport, conveyance, or other mechanical device used for transport. For example, a vehicle 102 may be used to transport users, passengers and/or freight. Exemplary vehicles 102 may include automobiles, motorcycles, tricycles, locomotives, watercraft such as ships, boats, and submarines, or even aircraft in some examples. A road segment may be defined as a portion of roadway over which a vehicle 102 may be capable of traversing. A route 104 may be defined as an ordered path including one or more road segments in sequence, and may specify path over which the vehicle 102 may travel to reach a specified destination 106.

Vehicles 102 typically include various types of sensors 108 to monitor the vehicle 102 systems to facilitate vehicle 102 diagnostic functions. The information retrieved from the vehicles sensors 108 may be referred to as vehicle data 110. Exemplary vehicle sensors 108 may provide vehicle data 110 including one or more of: wheel slippage, air intake information, ambient air temperature information, throttle position, general or specific belt status information, airbag status information, light bulb status information, coolant status information, steering fluid status information, brake fluid status information, windshield wiper fluid status information, fluid leak status information, brake pad wear/replacement status information, brake cylinder wear/replacement status information, transmission wear status information, tire wear status information, tire pressure status information, tire balance status information, alignment degree status information, engine temperature, power window motor status information, power window belt and gear status information, air filter condition, cylinder firing and misfiring information, air fuel mixture, electronic and wiring system status information, battery strength status information, battery fluid status information, oil pressure status information, location information, vehicle speed information (e.g., velocity, acceleration, stops and starts), amount of vehicle time stopped, engine hours, whether sudden stops or starts are experienced, wiper status, head lights status, tail light status, time with brakes and throttle off (coasting off a stop), and wheel slippage information, as some non-limiting examples.

Vehicle data 110 based on the vehicle sensors 108 may be made available for use by way of a data port reader 112. One exemplary data port reader 112 for use in receiving vehicle data 110 from sensors 108 may be a device installed to connect to a standard on-board diagnostics II (ODB-II) port of the vehicle 102. As another example, a vehicle telematics unit embedded in the vehicle 102 may also provide a data port reader 112 functionality to receive vehicle 102 diagnostic and/or real time vehicle data 110. The data port reader 112 may make available the aforementioned types of vehicle data 110, such as speed data (e.g., determined according to global positioning systems or on-board diagnostics), accelerometer data (e.g., from a 3-axis accelerometer sensors 108 oriented to the coordinate frame of the vehicle 102), data on length and frequency of vehicle 102 stops, vehicle 102 diagnostic data, and vehicle 102 absolute global positioning latitudinal and longitudinal location data.

Users may have preferences for routes 104 having certain characteristics. The contextual parameters 114 may be parameters utilized by the system 100 that are indicative of these user routing preferences. For instance, the contextual parameters 114 may allow the user to request routes 104 having certain quality or emotional characteristics, such as "more enjoyable", "more scenic", "hilly", "mountainous", "more exciting" journey, "longer but less stop and go traffic", "longer but less chance of getting into an accident", as some non-limiting examples. The contextual parameters 114 may accordingly be used to define route 104 characteristics that appeal to the user's view of scenery, traffic conditions, crime in area, or aversion to getting in an accident. Contextual parameters 114 may be included in requests for routes 104. Additionally or alternatively, contextual parameters 114 may be retrieved from routing preferences associated with a user of the routing application 142. As explained in detail below, the routing application 142 may utilize the traffic score 124 information to generate a recommended route 104 according to the received contextual parameters 114.

Each vehicle 102 may include or otherwise be associated with a processing device 116. The processing device 116 may include a combination of hardware and software, and may further include one or more software applications or processes for causing one or more computer processors to perform the operations of the processing device 116 described herein. In some instances the processing device 116 may be embedded within the vehicle 102 itself, while in other instances the processing device 116 may be a mobile device carried by an occupant of the vehicle 102. Exemplary mobile processing devices 116 may include laptop and tablet computers, mobile telephones and smart phones, GPS devices, personal digital assistants, e-Book readers, and processing devices included within vehicles 102, among others. Each processing device 116 may be configured to be in selective communication with one or more networks, including one or more communications networks 118.

Communications networks 118 may include one or more interconnected networks (e.g., public switched telephone network (PSTN), voice over internet protocol (VoIP), cellular telephone, general packet radio service, etc.), that provide communications services, including voice calling, packet-switched network services (including, for example, Internet access and/or VoIP communication services), short message service (SMS) messaging, multimedia messaging service (MMS) messaging services, and location services, to at least one connected device (e.g., data port readers 112 of the vehicles 102, processing devices 116, other mobile devices such as mobile phones, etc.).

The aggregation server 120 may be in selective communication over the communications network 118 with the one or more vehicles 102. The aggregation server 120 may be configured to receive the vehicle data 110 from the sensors 108 of the vehicles 102 via the data port reader 112 as well as user feedback 144 regarding aspects of the quality of travel, and use the received vehicle data 110 and user feedback information to determine inferred relationships 122 and traffic scores 124.

The inferred relationships 122 may include associations of contextual parameters 114 with aspects of the received vehicle data 110. For example, the inferred relationships 122 may indicate the presence of certain phenomena in the received vehicle data 110 that are commonly found in association with certain contextual parameters 114. As one possibility, an inferred relationship 122 may include an indication that certain data patterns in engine revolutions correlate well with hilly conditions.

The traffic scores 124 may include information related to the quality of travel of a vehicle 102 over road segments. The traffic scores 124 may be relative scores indicative of the relative quality of travel at a particular location and time as compared to other locations and times. As one example, the traffic scores may rank the traffic flow over the corresponding road segments (e.g., on a scale of 1-100 where 100 is clear travel and 1 is impassible). Traffic scores 124 may be heuristically determined according to one or more factors identified based on received data, such as the presence and number of vehicle 102 stops, the length of vehicle 102 stops, vehicle 102 speed, vehicle 102 speed between stops, travel time over roadway segments 136, and ambient weather conditions, as some examples. Further aspects of the generation of traffic scores 124 are discussed in detail below with respect to the data flow 200 of FIG. 2.

The aggregation server 120 may also be in selective communication over the communications network 118 with one or more data servers hosting additional information that may affect determination of traffic scores 124. As some examples, the aggregation server 120 may be in selective communication with weather data systems 126, traffic data systems 130, navigation data systems 134, and network data systems 138.

The weather data system 126 may be configured to selectively store and retrieve weather information 128 indicative of historical actual weather data, present weather conditions, and forecasted future weather conditions. Exemplary elements of weather information 128 may include: road closures, road slowdowns, flooded roadways, hydroplane risks, standing water, snow, wind, ice or ice patches, out of service traffic signals, potential weather threats (e.g., tornados, lightning, rain, ice, snow, high winds), road salt/de-icing chemicals applied, road salt/de-icing chemicals applied and combined with melting snow, sand storms, sand in road (e.g., near beaches, in a desert), down trees, sunshine slowdown, temperature extremes (i.e., causing overheating or difficulty starting cars) as some non-limiting examples.

The traffic data system 130 may be configured to selectively store and retrieve traffic information 132 related to historical, present, and forecasted traffic conditions. The traffic information 132 may include data relating to road congestion for various roads received from road or other infrastructure sensors. Exemplary elements of traffic information 132 may include: traffic volume, traffic density, sudden changes in traffic (e.g. a spike in traffic resultant from conclusion of an event such as a movie or concert), accidents, stalls, moving violations (speeding, failure to stop/yield, illegal turns, wrong way driving, reckless driving), make/model/body type of vehicles 102 within camera range, number of vehicles 102 at a signal, time each vehicle 102 spends at a signal or other location, rate of traffic density increase or decrease (e.g., how quickly morning rush hour forms and dissipates in specific locations, road conditions (e.g., cars sliding, snow/rain/standing water, road deterioration), traffic speed, individual vehicle 102 speed, traffic pacing, lane speed, pedestrian movement, bicycle motorcycle traffic, issues creating traffic such as poorly designed merges, mistimed lights, busy intersections, and traffic waves (e.g., moving backward through a plurality of vehicles 102), blockades, lane closures, density of traffic flowing through region, as some non-limiting examples.

The navigation data system 134 may include information regarding the roads and terrain that may be traversed by a vehicle 102. For example, the navigation data system 134 may provide geographic road segment information 136 related to the roadways or other paths over which the vehicles 102 may traverse. Exemplary elements of geographic road segment information 136 may include: grade information, elevation information, road layout, speed limits, road capacities, and indications of road construction or other planned closures and/or delays.

The network data system 138 may be configured to selectively store and retrieve network information 140 related to communications over the communications network 118. For example, the network data system 138 may provide GPS or other location information related to the location of mobile devices, processing devices 116 or other devices connected to the network data system 138.

A routing application 142 may be one application included on the processing device 116, wherein the routing application 142 may be implemented at least in part by instructions stored on one or more computer-readable media. Computer-executable instructions may be compiled or interpreted from computer programs created using a variety of programming languages and/or technologies, including, without limitation, and either alone or in combination, Java™, C, C#, C++, Visual Basic, Java Script, Perl, PL/SQL, etc. The routing application 142 may be written according to a number of these and other programming languages and technologies, or a combination thereof. The routing application 142 may include instructions to cause the processing device 116 to compute a route 104 for the vehicle 102 based on determined inferred relationships 122 and traffic scores 124.

The routing application 142 may further receive contextual parameters 114 indicative of user preference for routes 104 having certain characteristics. For instance, the contextual parameters 114 may allow the user to request routes 104 having certain quality or emotional characteristics, such as "more enjoyable", "more scenic", "hilly", "mountainous", "more exciting" journey, "longer but less stop and go traffic", "longer but less chance of getting into an accident", as some non-limiting examples. The contextual parameters 114 may accordingly be used to define route 104 characteristics that appeal to the user's view of scenery, traffic conditions, crime in area, or aversion to getting in an accident. Contextual parameters 114 may be included in requests for routes 104. Additionally or alternatively, contextual parameters 114 may be retrieved from routing preferences associated with a user of the routing application 142. As explained in detail below, the routing application 142 may utilize the traffic score 124 information to generate a recommended route 104 according to the received contextual parameters 114.

The routing application 142 may further facilitate the providing of user feedback 144 to the aggregation server 120 regarding whether a determined route 104 actually met the contextual parameters 114 as requested by the user. For example, a user may have requested a "hilly" contextual parameter 114 for generation of a route 104, but may have received a route 104 over flat terrain. Accordingly, the user may utilize the routing application 142 to provide user feedback 144 to the aggregation server 120 indicating that the route 104 was not actually "hilly". This feedback may be utilized by the system 100 to adjust the determination of traffic scores 124 to aid in the determination of future routes 104.

Additionally, the routing application 142 may be configured to allow users to provide user feedback 144 regarding road segments apart from the determination of a route 104. For instance, after traversing one or more road segments, a vehicle occupant may provide information to the aggregation server 120 indicating contextual parameters 114 associated with the road segments that were traversed. As an example, after traveling down an especially scenic road segment, a vehicle occupant may indicate to the aggregation server 120 that the road segment is scenic.

While FIG. 1 illustrates an exemplary system 100, other implementations may be used. In some implementations, additional elements may be included or elements shown in FIG. 1 may be omitted or modified. For example, one or more of weather data system 126, traffic data system 130, navigation data system 134, and network data system 138 may be combined in certain implementations. As another example, aggregation server 120 and one or more of the weather data system 126, traffic data system 130, and navigation data system 134 may be combined, or the processing device 116 may be implemented on multiple or separate devices. As yet a further example, the aggregation server 120 may offload some of the processing from the routing application 142. For example, rather than routing application 142 itself computing a route 104 for the vehicle 102, the routing application 142 may instead query an aggregation server 120 or other computing device with a message including information destination location, and may receive in response a recommended route 104.

Figure 2:
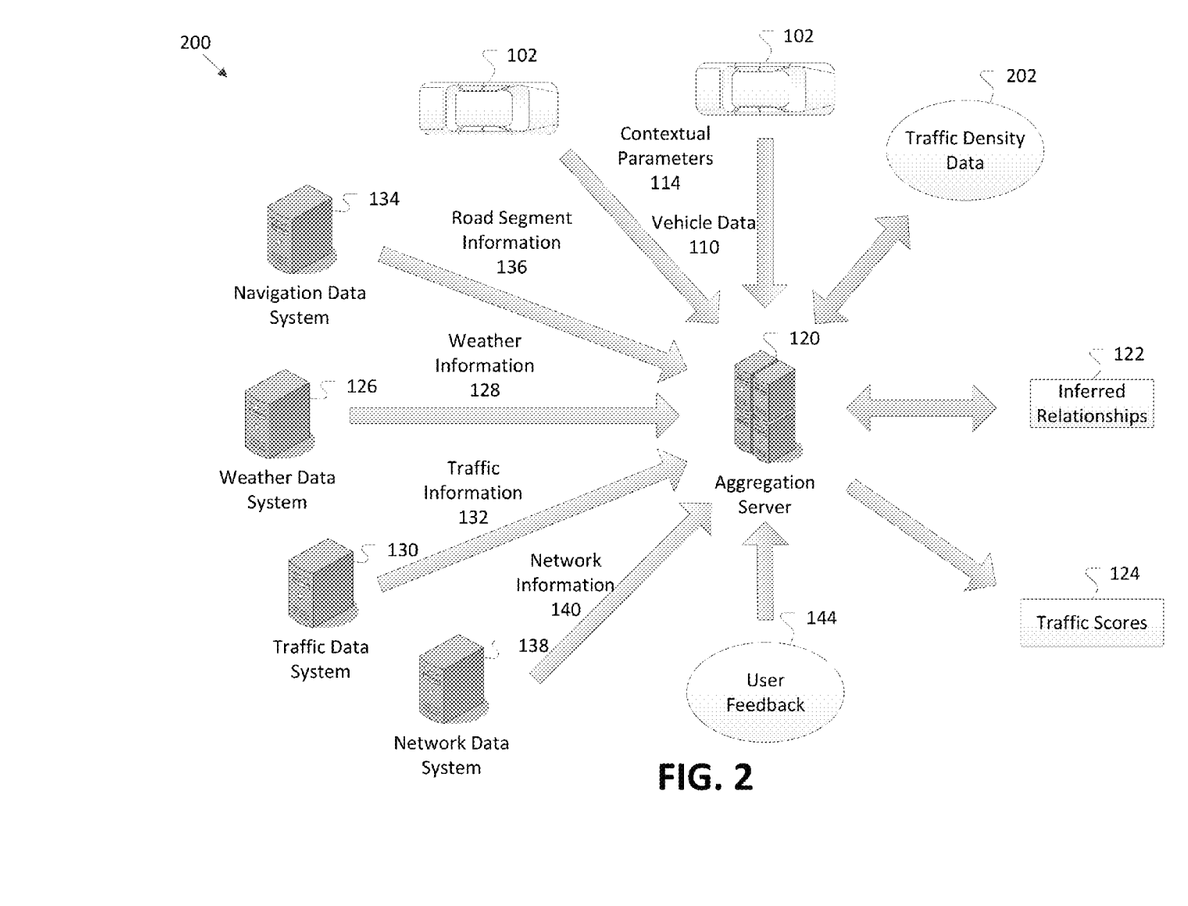
FIG. 2 illustrates an exemplary data flow for the determination of traffic density data and traffic scores.

FIG. 2 illustrates an exemplary data flow 200 for the determination of traffic density data 202 and traffic scores 124. The aggregation server 120 may be configured to identify the traffic density data 202 based on the vehicle data 110 received from the plurality of vehicles 102. The aggregation server 120 may be further configured to determine traffic scores 124 using data obtained from various sources, such as the identified traffic density data 202, vehicle data 110 from a plurality of vehicles 102, weather information 128, traffic information 132, road segment information 136, network information 140, and user feedback 144.

The traffic density data 202 may include various measures of vehicle 102 traffic flow based on identified characteristics of the speed, acceleration and direction of vehicle 102 travel. For instance, the aggregation server 120 may determine a measure of traffic density data 202 by judging relative acceleration and deceleration associated with a particular vehicle 102, based on the speed data included in accelerometer vehicle data 110 corresponding to the vehicle 102. Using the accelerometer vehicle data 110 and determining the force of particular stops (e.g., in terms of a G-force measurement of acceleration felt as weight), the aggregation server 120 may be configured to infer a relative density of traffic. For example, harder stops or a greater amount of time spent at a lower speed as compared to the time spent accelerating to a faster speed may be indicative of a higher density of vehicle 102 traffic. Such a measure of relative acceleration and deceleration may be a better measure of traffic density data 202 than simple speed, as the quality of a driving experience may not directly correlate with a relative speed of travel.

The aggregation server 120 may be configured to determine other traffic density data 202 measurements related to speed and stopping. For example, vehicle data 110 may include vehicle speed information, from which an amount of stops may be inferred along with durations of the stops, amounts of time spent stopping, stopped and/or accelerating. At speeds approaching zero, the aggregation server 120 may determine the vehicle 102 to be stopped. For example, a vehicle 102 may be considered stopped at below 4 MPH depending on roadway speed (e.g., 1-2 MPH may be substantially stopped on a segment 136 with a speed limit of 70 miles-per-hour but not on a segment 136 with a speed limit of 25 miles-per-hour). The aggregation server 120 may also determine a traffic density data 202 measurement according to a length of the determined stop, for example, measured from a time the vehicle speed remains substantially stopped (e.g., zero miles-per-hour, or up to 1-2 miles-per-hour depending on roadway speed). As additional possibilities, the aggregation server 120 may determine traffic density data 202 measurements related to vehicle 102 speed between stops, such as mean, median, and maximum speeds that the vehicle 102 may attain between the stops and the volume of vehicles 102 registering within that specific zone relative to a pre-established norm for that data, date, and time.

The aggregation server 120 may further determine traffic density data 202 measurements according to the relative timing and distance between stops. For instance, the aggregation server 120 may determine a traffic density data 202 measurement related to the frequency of vehicle 102 stops. As one possibility, the aggregation server 120 may determine a measure of stops having at a frequency of less than or up to a predetermined period of time apart (e.g., number of stops less than or up to a minute apart). The aggregation server 120 may also determine travel time measures along segments 136 of geographic mapping data. In some cases, these travel time measures may be determined according to vehicle data 110 received from multiple vehicles 102.

The aggregation server 120 may determine other traffic density data 202 measurements instead of or in addition to the aforementioned possibilities. As some non-limiting examples, the aggregation server 120 may determine one or more of: speed relative to other vehicles 102 in same general space and relative to same time and location on other days and relative to other day-parts, speed relative to speed limit, number of vehicle stops in one minute or other period of time, number of vehicle stops in period of time relative to other vehicles 102 in same space, distance between cars within a designated space, (e.g., 100 yards, one mile), volume of vehicles 102 within a designated space, (e.g., 100 yards, one mile), number of vehicle starts per minute, time vehicle spends idle, time between vehicle being idle, number of vehicles 102 idle within a designated space, time vehicle spends at or below a posted speed limit (e.g., time spent 19%, 20% or 25% below the posted speed limit) and normal speeds for that day-part/day/location, distance between stops, distance between idling periods, number of times a brake is applied, length of time brakes are engaged, g-forces indicating stopping and starting, slippery roads, rough roads, and roadway air temperature.

The aggregation server 120 may be configured to algorithmically determine traffic scores 124 according to one or more of the aforementioned traffic density data 202 factors identified based on various received types of data. As one example, the aggregation server 120 may be configured to determine the traffic scores 124 according to traffic density data 202 factors including the presence and number of vehicle 102 stops, the length of vehicle 102 stops, vehicle 102 speed, vehicle 102 speed between stops, vehicle 102 travel time over roadway segments 136, and weather information 128 indicative of ambient weather conditions.

In some examples, the aggregation server 120 may identify inferred relationships 122 in the various received types of data to provide information regarding travel conditions over geographic road segments 136 or grouping of segments 136. Exemplary inferred relationships 122 may identify traffic score 124 factors indicative of ease of travel, predicted traffic density, predicted quality of scenery, predicted aggression of neighboring drivers, or any other predicted inference based on the set of input parameters. The inferred relationships 122 may further include a time component, such that the traffic score 124 information regarding travel conditions may be associated with a time of day or day-part.

Based on the collected data, the aggregation server 120 may be configured to perform analysis on the data to determine data elements that are relative outliers for a particular time period. If these relative outliers appear consistent with the presence of certain types of user feedback 144 (e.g., indications that a road segment is "hilly"), then the outlier data elements may be learned by the system as being indicative of those types of user feedback 144 (e.g., the outlier elements as a predictor that a road segment is "hilly"). More specifically, the aggregation server 120 may utilize the received data as input parameters to a linear regression analysis configured to determine linear dependency relationships between parameters of the input data. The regression analysis may accordingly test how different input parameters compare to similar parameters at the same relative location at other specified days or times. By performing the analysis of the input parameters, the aggregation server may accordingly determine which values lie relatively further away from mean values for their corresponding data sets. The aggregation server 120 may utilize other approaches to analyze the received data as well, such as multivariate regression, principle component analysis, K-means clustering, or hierarchical clustering approaches that operate on the data set in multiple dimensions and find interpretational correlations between input parameters.

Based on the identified outlier data elements (i.e., non-normal parameters), the aggregation server 120 may be configured to generate an inferred relationship 122 based on a difference between the non-normal parameters and historical norms for the parameters that are not deemed to be outliers (e.g., previous routes by the vehicle 102 or by other vehicles 102 at the same or similar locations or segments 136, average traffic density, traffic speed, amount of stop and go traffic, etc.). As a simple example, the aggregation server 120 may identify non-normal parameters resulting in a decreased traffic score 124 during sunset because drivers typically drive slower when the sun is near the horizon and obstructs the driver's view.

The aggregation server 120 may be further configured to utilize a supervised heuristic learning algorithm, such as neural network or support vector heuristic, to classify the inferred relationship 122. For example, based on a correlation of driver slowdowns for vehicles 102 headed west during sundown with user feedback 144 of the sun being in the vehicle occupant's eyes, the aggregation server 120 may infer that the sundown time is related to the slowdown, and further that future sundown events at different times of day may be predicted to have similar effects.

Figure 3:
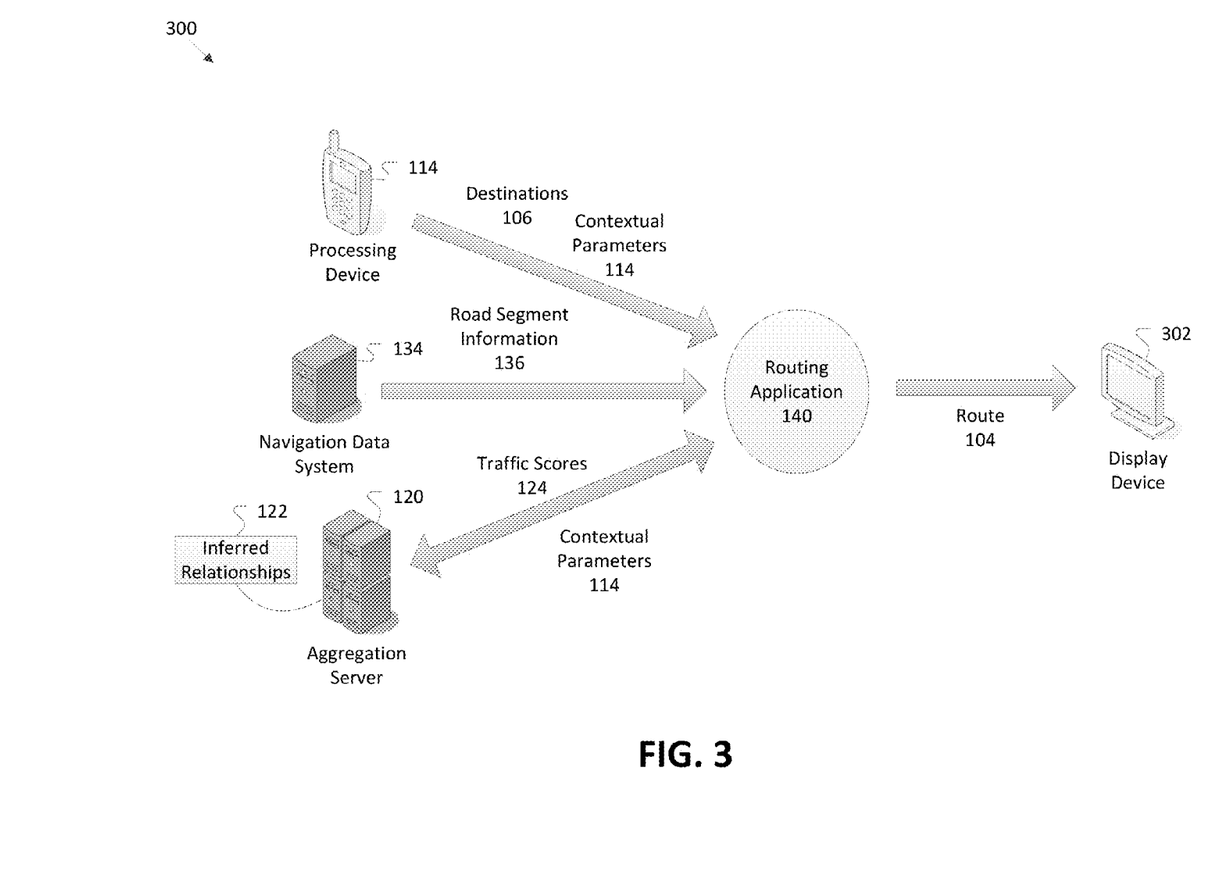
FIG. 3 illustrates an exemplary data flow for the determination of a route to a destination according to traffic scores.

FIG. 3 illustrates an exemplary data flow 300 for the determination of a route 104 to a destination 106 according to traffic scores 124. Using a system such as exemplary system 100, a user may input one or more destinations 106 into the routing application 142 running on processing device 116. The destinations 106 may be indicative of one or more locations that the user is trying to reach using a vehicle 102. The routing application 142 may determine the route 104 using road segment information 136 and the traffic scores 124, as well as additional factors such as weather information 128 and traffic information 132. The determined route 104 may be displayed to the user on a display device 302.

The routing application 142 may further receive road segment information 136. The road segment information 136 may be received over the communications network 118 dynamically from the navigation data system 134, and/or from local storage on the processing device 116, such as from a loaded computer disk. The road segment information 136 may include road layout information indicating the connections of the roads segments 136 to one another. The road segment information 136 may further include information that may be used to aid in determining the cost of a particular segment 136 of roadway, such as segment 136 length and segment 136 speed limit.

The routing application 142 may determine the route 104 using the destinations 106 and the road segment information 136 according to various techniques and heuristics. For instance, road information based on the road segment information 136 may be represented by a heuristic as a graph data structure having a plurality of vertices where the segments 136 intersect. Using the graph data structure, an algorithm such as Dijkstra's algorithm or the A* algorithm may be used to assign cost values to each path or vertex, and then find a path from one destination 106 to another destination 106 on the graph according to the assigned costs. Dijkstra's algorithm is described in detail in Dijkstra, E. W. (1959) "A note on two problems in connexion with graphs." Numerische Mathematik 1, pages 269-271, and the A* algorithm is described in detail in Hart, P. E.; Nilsson, N.J.; Raphael, B. (1968). "A Formal Basis for the Heuristic Determination of Minimum Cost Paths." IEEE Transactions on Systems Science and Cybernetics, pages 100-107. These algorithms may be utilized, for example, to implement a shortest path heuristic determining a shortest route 104.

In Dijkstra's algorithm, a vertex nearest to the origin is set to be the current node, and is assigned a value of zero. All other vertices are assigned a value of infinity. Then, the algorithm determines a cost from the current node to each connected vertex. If a determined cost to reach a vertex is less than a previously recorded cost, then the lower cost to the vertex overwrites the previous cost. Once the analysis of each connected vertex is performed for a given vertex, the given vertex is marked as visited and is not evaluated again. The unvisited vertex with the smallest distance from the initial starting point is set as the next current node, and the process repeats. Once all nodes have been visited, the algorithm starts at the destination, and marks the path backwards to the vertex with the lowest assigned cost. The algorithm continues to mark the path backwards to vertices with the lowest assigned costs until reaching the origin location. This marked path is then output as the shortest path. The A* algorithm is similar to Dijkstra's algorithm, but further accounts for the cost from the starting vertex to each vertex during the analysis, rather than just the cost from the current vertex to the next vertex.

The routing application 142 may further receive contextual parameters 114 indicative of user preference for routes 104 having certain characteristics. For instance, the contextual parameters 114 may allow the user to request routes 104 having certain emotional characteristics, such as "more enjoyable", "more scenic", "mountainous", "more exciting" journey, "longer but less stop and go traffic", "longer but less chance of getting into an accident", as some non-limiting examples. The contextual parameters 114 may accordingly be used to define route 104 characteristics that appeal to the user's view of scenery, traffic conditions, crime in an area, or aversion to getting into a vehicle 102 accident.

To provide a proposed route 104 according to the received contextual parameters 114, the routing application 142 may assign weighing factors to the cost of paths according to traffic scores 124 for the path segments 136 that relate to the received contextual parameters 114. For instance, if the user inputs a contextual parameter 114 preferring less stop and go traffic, the routing application 142 may weigh the road segments 136 according to traffic scores 124 representative of relative level of stop and go traffic along the path segments 136. In some examples, the routing application 142 may provide a request to the aggregation server 120 for traffics scores 124 related to the received contextual parameters 114, and may use the received traffic scores 124 as weighing factors. The routing application 142 may accordingly optimize the route 104 accounting for the modified path cost to create a route 104 that may not be shortest, but that may fit with the constraints of the contextual parameters 114 requested the user.

In some cases, the routing application 142 may determine that no possible route 104 may be generated that conforms to the received contextual parameters 114. In such a case, the routing application 142 may propose a later travel time during which the requirements of the contextual parameters 114 may be met. As another example, if only certain contextual parameters 114 may be met (or certain contextual parameters 114 may only be met without also meeting other contextual parameters 114), the routing application 142 may provide that information to the user, and may prompt the user to clarify which contextual parameters 114 to use.

Once the routing application 142 has determined the route 104, the routing application 142 may send the route 104 to a display device 302 for display. In some instances, the route 104 may be displayed on a screen of the processing device 116 itself. In other instances, the route 104 may be exported into a GPS display device 302 or other device that may display the route 104 information, e.g., superimposed on a map. In still other instances, the route 104 may be displayed as a list of destinations 106, optionally including textual descriptions of any turns or other movements necessary to follow the route 104 from one destination 106 to the next.

Figure 4A:
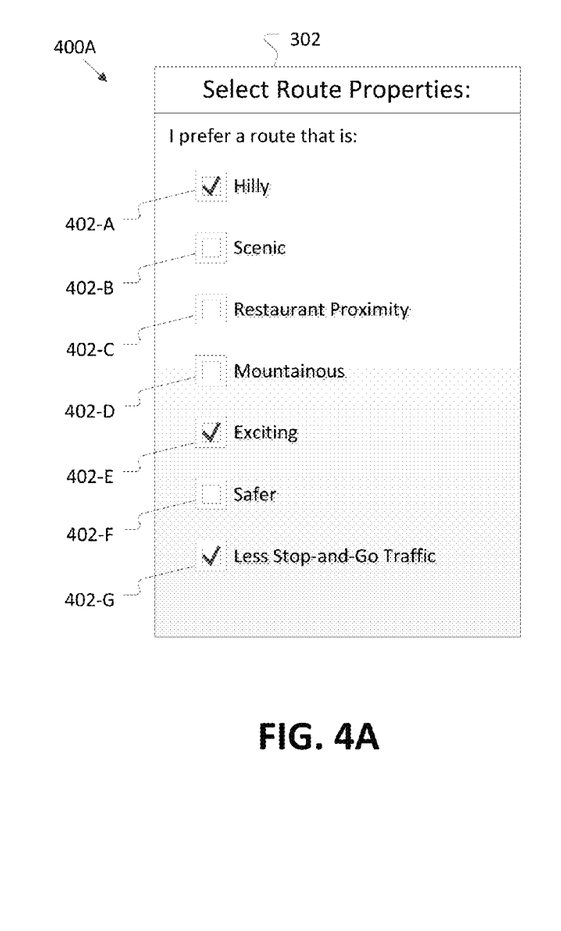
FIG. 4A illustrates an exemplary user interface configured to receive contextual parameters from a user for use in the generation of a route.

FIG. 4A illustrates an exemplary user interface 400-A configured to receive contextual parameters 114 from a user for use in the generation of a route 104. The user interface 400-A may be displayed to the user on a display device 302, such as a screen of the processing device 116. As illustrated, the user interface 400-A may include a prompt or message requesting user entry of desired contextual parameters 114 for use in creation of a route 104, and plurality of selectable contextual parameter options 402 to use to input the requested information. When selected, each selectable contextual parameter options 402 indicates a preference for an associated corresponding contextual parameter 114, but when unselected, each selectable contextual parameter options 402 does not indicate a preference for an associated corresponding contextual parameter 114. As illustrated, the user interface 400-A receives a preference for routes 104 that are "hilly," "exciting," and with "less stop-and-go traffic." In other exemplary user interfaces 400, the plurality of selectable contextual parameter options 402 may allow for other aspects of control of preference for contextual parameters 114. For example, the contextual parameter options 402 may be configured to receive relative weights for preference for contextual parameters 114, e.g., each on a scale from one to five, with five being considered relatively more important to routing and one being considered relatively less important for routing.

Figure 4B:
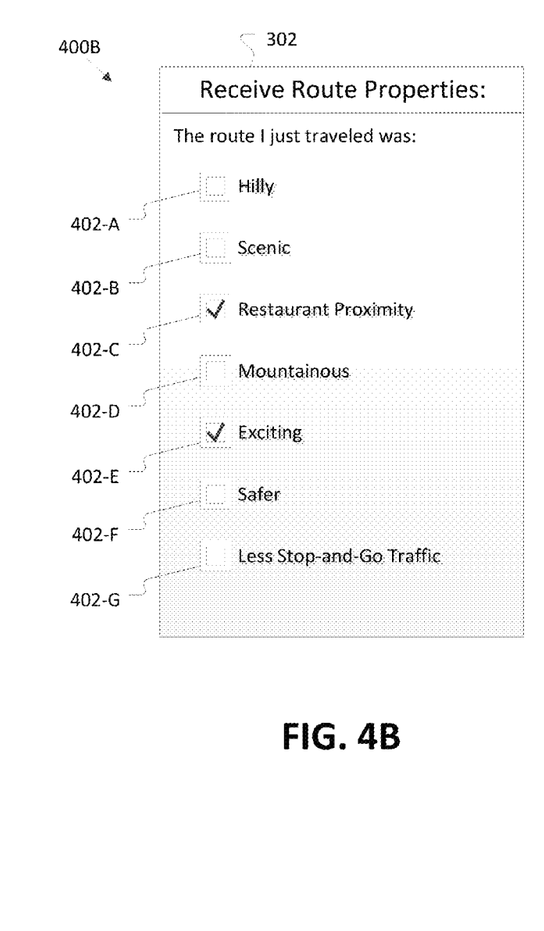
FIG. 4B illustrates an exemplary user interface configured to receive contextual parameters from a user based on a traversed route.

FIG. 4B illustrates an exemplary user interface 400-B configured to receive user feedback 144 on contextual parameters 114 from a user based on a traversed route 104. The user interface 400-B may also be displayed to the user on a display device 302, such as a screen of the processing device 116. As illustrated, the user interface 400-B may include a prompt or message requesting user entry of contextual parameters 114 descriptive of a traversed route 104, and plurality of selectable contextual parameter options 402 to use to input the requested information.

The user interface 400-B may be presented to a user after vehicle 102 traversal of road segments 136 in order to gain user feedback 144 about the traversed segments 136. For example, the routing application 142 may provide the user interface 400-B to vehicle occupants after traversing one or more road segments 136 to receive contextual parameter 114 information about those road segments 136. The received contextual parameter 114 information may be used by the aggregation server 120 in combination with other sources of data, such as vehicle data 110, to allow the aggregation server 120 to improve its learning of which variables from the vehicle data 110 are correlated with what contextual parameters 114. For instance, if a user selects that a traversed road segment 136 is "hilly," then the aggregation server 120 may infer that aspects of the received vehicle data 110 corresponding to the route may be predictive of other road segments 136 that may also be "hilly."

As another example, the user interface 400-B may be presented to a user after vehicle 102 traversal of a recommended route 104, to allow the system 100 to receive user feedback 144 on whether the recommended route 104 satisfied the specified contextual parameters 114. For example, the user interface 400-B may be provided at the conclusion of a generated route 104, with the contextual parameter options 402 pre-populated with the selections used in the generation of the route. The user interface 400-B may then receive any selections or de-selections of deviations of contextual parameter options 402 to inform the system 100 of characteristics of the route 104 as traveled, further allowing the aggregation server 120 to improve its learning of which aspects of the received vehicle data 110 infer what contextual parameters 114.

Figure 5:
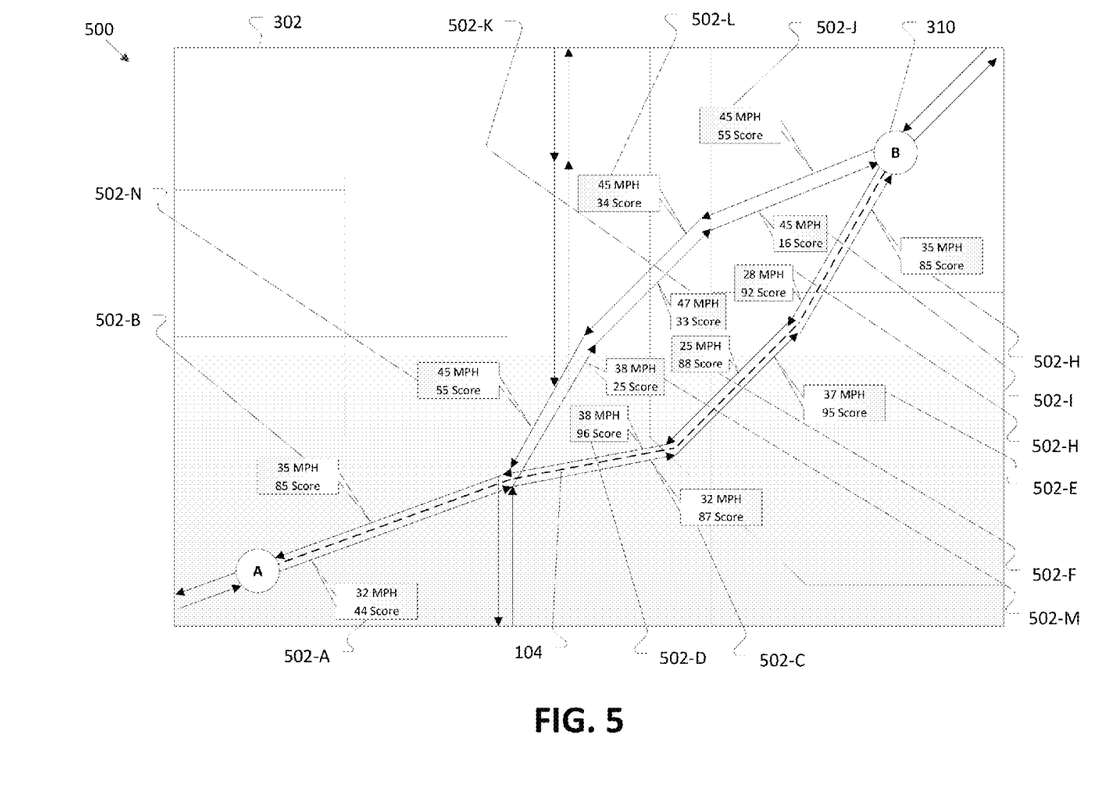
FIG. 5 illustrates an exemplary user interface including a route determined according to traffic scores.

FIG. 5 illustrates an exemplary user interface 500 including a route 104 determined according to traffic scores 124. The exemplary route 104 may be determined by the processing device 116 from a location labeled (A), to a destination 106 location labeled (B). The route 104 may accordingly be displayed to the user on a display device 302 such as a screen of the processing device 116. As shown in FIG. 4, segments 136 of a map are indicated on the display device 302 as solid directed lines, and the route 104 is indicated as a dashed line superimposed on the map. However, this visualization is only exemplary, and other visualizations of the route 104 on a map are possible.

The display device 302 further illustrates a plurality of segment indications 502-A through 502-N, each including an indication of the speed of travel over a corresponding segment 136, as well as a traffic score 124 over the corresponding segment 136. Accordingly, it can be seen that traffic score 124 may vary from travel speed, such that faster traffic may not necessarily yield a higher traffic score 124. For example, a segment 136 may have a higher traffic score 124 because the segment 136 is more scenic or has a lower incidence of stop-and-go traffic, not because the segment 136 has a faster average speed of traversal. While the segment indications 502 are visualized as call-outs associated with the displayed segments 136, other visualizations are possible. As one example, the segment indications 502 may be displayed as colors in which the segments 136 may be presented, with different colors being indicative of traffic scores 124 within different ranges of values (e.g., red for low scores, yellow for medium scores, and green for high scores.).

In the user interface 500, two paths are indicated as being available from source point (A) to destination 106 point (B). Moreover, it can be seen that the speed of travel is higher over the upper path, but the traffic score 124 is higher over the lower path taken by the proposed route 104 (e.g., as shown in indications 502-C, 502-F and 502-H as compared to indications 502-M, 502-K and 502-I). For this to occur, the user may have specified a contextual parameter 114 requesting a minimum traffic score 124, and based on that determination, the traffic scores 124 may be utilized to prefer a higher quality route 104 over a potentially faster route 104. When determining the route, the processing device 116 may accordingly weigh the segments 136 at least in part according to the determined traffic scores 124, thereby allowing for the user's preference to be utilized when determining a route 104. Thus, despite the upper path potentially being faster, the processing device 116 instead determines to route over the lower path to maximize traffic score 124 rather than travel speed.

Figure 6:
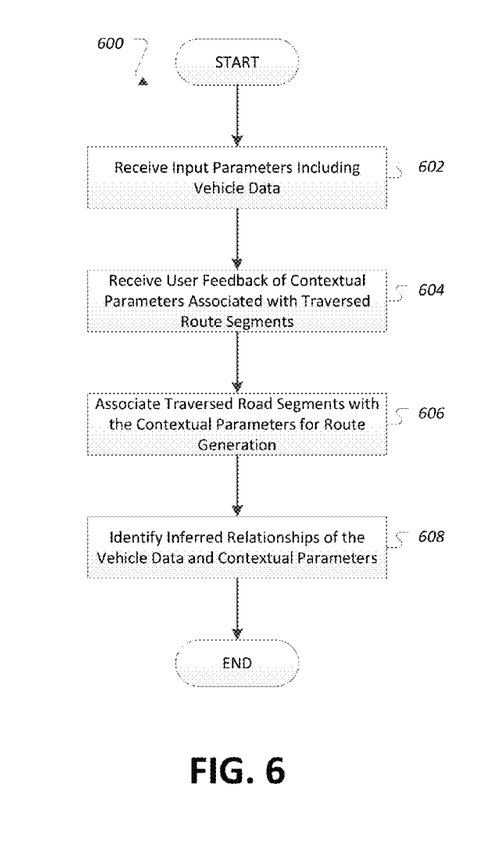
FIG. 6 illustrates an exemplary process for the identification of inferred relationships and contextual parameters.

FIG. 6 illustrates an exemplary process 600 for the identification of inferred relationships 122 and contextual parameters 114. The process 600 may be performed, for example, by an aggregation server 120 in communication with a plurality of vehicles 102 configured to provide vehicle data 110.

At block 602, the aggregation server 120 receives input parameters for vehicle 102 traversing one or more road segments 136. For example, the aggregation server 120 may receive vehicle data 110 from data port reader 112 devices connected to the vehicles 102 that capture and transmit vehicle data 110 from vehicle sensors 108. The vehicle data 110 may include, as some non-limiting examples, speed data, accelerometer data, data on length and frequency of vehicle 102 stops, vehicle 102 diagnostic data, and vehicle 102 absolute global positioning latitudinal and longitudinal location data. The aggregation server 120 may additionally receive data from additional sources, such as road segment information 136 from a navigation data system 134, weather information 128 from a weather data system 126, traffic information from a traffic data system 130, network information 140 from a network data system 138, and traffic density data 202 determined by the aggregation server 120.

At block 604, the aggregation server 120 receives user feedback 144 of contextual parameters associated with traversed road segments 136. For example, a routing application 142 executed by a processing device 116 of the user's vehicle 102 may present the user interface 400-B to a user, and may receive information regarding contextual parameters 114 associated with the traversed segments 136.

At block 606, the aggregation server 120 associates the traversed road segments 136 with the received contextual parameters 114. For example, the aggregation server 120 may maintain data indicative of the contextual parameters 114 associated with different road segments 136, and may include the received contextual parameters 114 in the maintained data. The aggregation server 120 may accordingly build up a data store of map information by receiving contextual parameters 114 information from a plurality of vehicles 102 about a plurality of road segments 136.

At block 608, the aggregation server 120 identifies inferred relationships 122 of the contextual parameters 114 according to the received input parameters. For example, as discussed throughout (e.g., with respect to data flow 200), the aggregation server 120 may perform heuristic learning techniques to infer which received vehicle data 110 corresponds to the received user feedback contextual parameters 114.

As one possibility, the aggregation server 120 may determine outlier elements based on the received input parameters. The outlier elements may be determined according to various techniques, such as linear regression, multivariate regression, principle component analysis, K-means clustering, or hierarchical clustering approaches that operate on the data set in multiple dimensions and find interpretational correlations between input parameters. In some cases, data for weekdays may be compared to previous weekdays, while weekend days may be compared to previous weekend days.

Based on the analysis, the aggregation server 120 may determine that certain input parameters are outside an average or other normal historical value for the parameters. These outlier data elements may be identified in an inferred relationship 122 as being indicative of the user-specified contextual parameters 114 from the user feedback 144.

For example, based on the identified outlier data elements (i.e., non-normal parameters), the aggregation server 120 may be configured to generate an inferred relationship 122 based on a difference between the non-normal parameters and historical norms for the parameters that are not deemed to be outliers (e.g., previous routes by the vehicle 102 or by other vehicles 102 at the same or similar locations or segments 136, average traffic density, traffic speed, amount of stop and go traffic, etc.). As a simple example, the aggregation server 120 may identify an inferred relationship 122 between decreased vehicle 102 speed at sunset time because drivers typically drive slower when the sun is near the horizon and obstructs the driver's view.

These inferred relationships 122 may be used to infer contextual parameters 114 associated with other road segments 136 (e.g., based on input parameters including data received from vehicles 102 traversing other road segments), including those for which the aggregation server 120 has not received contextual parameters 114 from users. After block 608, the process 600 ends.

Figure 7:
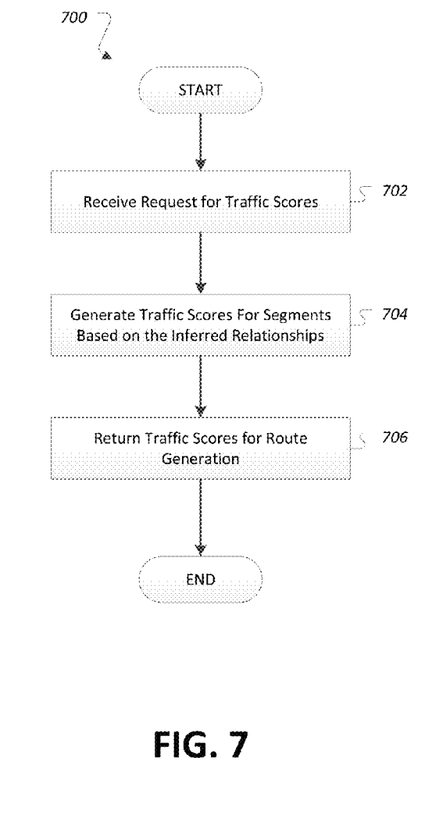
FIG. 7 illustrates an exemplary process for the providing of traffic scores according to contextual parameters.

FIG. 7 illustrates an exemplary process 700 for the providing of traffic scores 124 according to contextual parameters 114. The process 700 may be performed, for example, by an aggregation server 120 in communication with a processing device 116 and a plurality of vehicles 102 configured to provide vehicle data 110.

At block 702, the aggregation server 120 receives a request for traffic scores 124. For example the aggregation server 120 may receive a request for traffic scores 124 from a processing device 116 specifying one or more contextual parameters 114 to be used in generation of a route 104.

At block 704, the aggregation server 120 generate traffic scores 124 based on the contextual parameters 114. For example, the aggregation server 120 may identify contextual parameters 114 associated with road segments that may be included in a generated a route 104, based on inferred relationships 122 regarding contextual parameters 114 and received input parameters associated with the road segments. The aggregation server 120 may further compute traffic scores 124 based on a matching of the contextual parameters 114 associated with the potential segments to the contextual parameters 114 specified in the received request.

At block 706, the aggregation server 120 provides the generated traffic scores 124 for use in generation of routes 104. For example, the traffic scores 124 may be provided to a processing device 116 responsive to the request for traffic scores 124, and utilized in the process 800 discussed below with respect to FIG. 8. After block 706, the process 700 ends.

Figure 8:
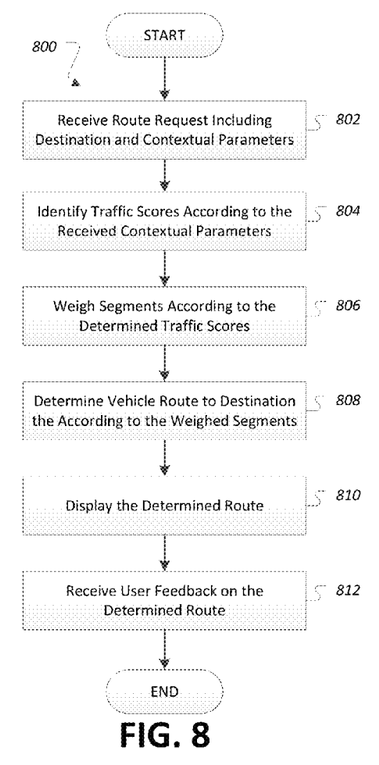
FIG. 8 illustrates an exemplary process for the determination of a route accounting for contextual parameters.

FIG. 8 illustrates an exemplary process 800 for the determination of a route 104 accounting for contextual parameters 114. As an example, the process 800 may be performed by a processing device 116 executing a routing application 142 and in communication with an aggregation server 120 over a communications network 118.

At block 802, the processing device 116 receives a request for a route 104. The request for a route 104 may include a destination 106 for a vehicle 102. For example, a user may enter or otherwise specify a destination 106 into a processing device 116, such as a mobile phone or an in-vehicle 102 navigational system or telematics device. The route request may also include one or more contextual parameters 114 indicative of user preference for routes having certain characteristics. Additionally or alternatively, contextual parameters 114 may be retrieved from routing preferences associated with a user of the routing application 142. As some examples, the contextual parameters 114 may indicate that the user prefers scenic routes, routes having less congestion that causes start/stop vehicle 102 actions, or routes with a lower likelihood of accident.

At block 804, the processing device 116 identifies traffic scores 124. For example, as discussed above with respect to the process 700, the processing device 116 may request traffic scores 124 for potential segments 136 to be used to determine the route 104 from the aggregation server 120. The requested traffic scores 124 may include relative scoring of the segments 136 according to the contextual parameters 114 indicated in the request. For example, if the contextual parameters 114 indicate that the user prefers scenic routes, the aggregation server 120 provides traffic scores 124 that may include relative scoring related to how scenic the segments 136 may be.

At block 806, the processing device 116 weighs the segments 136 according to the obtained traffic scores 124. For example, the processing device 116 may assign weighing factors to the cost of paths according to traffic scores 124 for the path segments 136 that relate to the received contextual parameters 114. For instance, if the user inputs a contextual parameter 114 preferring less stop and go traffic, the routing application 142 may weigh the road segments 136 according to traffic scores 124 representative of relative level of stop and go traffic along the path segments 136.

At block 808, the processing device 116 determines a route 104 for the vehicle 102 to travel. For example, the routing application 142 or aggregation server 120 may employ an algorithm such as Dijkstra's algorithm or the A* algorithm to find a route 104 from the present location to each of the received destinations 106 for the vehicle 102. In instances where the aggregation server 120 performs at least a portion of the processing, the aggregation server 120 may send a reply to the processing device 116 including the determined route 104.

At block 810, the processing device 116 provides the route 104 for display on a display device 302. In some instances, the route 104 may be displayed on a screen of the processing device 116. In other instances, the route 104 may be exported into a GPS device that may display the route 104 information superimposed on a map. In still other instances, the route 104 may be displayed as a list of destinations 106, optionally included textual descriptions of any turns or other movements necessary to follow the route 104.

At block 812, the processing device 116 receives user feedback 144 from the user regarding the determined route 104. For example, after routing the vehicle 102 to the specified destination 106, the processing device 116 may display a user interface such as the user interface 400-B to receive user feedback 144 regarding contextual parameters 114 of the route 104 as traveled. The user feedback 144 may be provided to the aggregation server 120 to allow the server to further refine the inferred relationships 122. After block 810, the process 800 ends.

Thus, improved traffic scores 124 indicative of the quality of travel along road segments 136 may be determined by an aggregation server 120 and used to improve the determination of routes 104 for vehicles 102 to destination locations 106. The traffic scores 124 may be determined based on information received from data port reader 112 devices connected to the vehicles 102 that capture and transmit vehicle data 110 from vehicle sensors 108 (e.g., vehicle speed, vehicle stops, and length of stops). An improved routing application 142 may utilize the traffic scores 124 to propose a customized route 104 to a destination 106 accounting for contextual parameters 114 specified by a user that are indicative of quality aspects to consider when determining routes 104, such as a minimum traffic score 124 or a more scenic route 104, despite the possibility of the scenic route 104 being suboptimal in other ways, such as being longer or slower to the destination 106.

In general, computing systems and/or devices, such as the processing device 116 or aggregation server 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the processing device 116 or aggregation server 120, generally include computer-executable instructions executable by one or more processors of the devices. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. For example, a program configured to cause the processing device 116 to perform the operations of that device discussed herein may be one such computer program product. Alternatively, functionality of the processing device 116 may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   an aggregation device to:
      receive input parameters including vehicle data from a plurality of vehicles traversing a set of road segments,
         the vehicle data being from at least one of:
            a telematics unit,
            a sensor, or
            a global positioning system device;
      receive user feedback from the plurality of vehicles indicating contextual parameters associated with the set of road segments;
      perform analysis on the vehicle data to determine a data element as an outlier;
      determine a relationship between the outlier and at least one of the contextual parameters;
      determine, based on the relationship, an association between the at least one of the contextual parameters and another set of road segments;
      receive a request for traffic scores associated with a specified contextual parameter,
         the specified contextual parameter being indicative of a quality preference for routing over segments of geographic mapping data,
      generate traffic scores based on the specified contextual parameter, the relationship, and the association; and
      provide, to a device associated with a vehicle, the traffic scores to generate a suggested route,
         the segments of geographic mapping data being weighed according to the traffic scores, and
         the suggested route being provided, for display, at the device associated with the vehicle.

2. The system of claim 1, where the quality preference for routing over the segments of geographic mapping data includes being at least one of:
   more enjoyable,
   more scenic,
   more exciting,
   having less stop and go traffic, or
   having a lower historical rate of vehicle accident.

3. The system of claim 1, where the specified contextual parameter is at least one of:
   included in a route request, or
   retrieved from routing preferences associated with a user of a routing application.

4. The system of claim 1, where the aggregation device, when receiving the request for traffic scores, is to:
  receive the request for traffic scores based on a route request; and
  where the suggested route is provided, for display, on a map,
    the map including indications of quality of segments along the route.
5. The system of claim 1, wherein the aggregation device communicates with a processing device,
  the processing device being at least one of:
    a mobile telephone, or
    a computing device embedded within a vehicle; and
  the processing device including a routing application configured to determine a route according to at least one of:
    Dijkstra's algorithm, or
    A* algorithm.
6. The system of claim 1, where the aggregation device, when receiving the user feedback, is to:
  receive the user feedback via a user interface,
    the user interface including at least one of a prompt or a message requesting user entry of the contextual parameters, and
    a plurality of selectable contextual parameter options to use to input the contextual parameters.
7. The system of claim 1, wherein the aggregation device is further to:
  generate an inferred relationship based on a difference between a non-normal parameter and historical norms for parameters that are not determined to be outliers.
8. The system of claim 1, where the aggregation device, when receiving the request for the traffic scores, is to:
  receive the request for the traffic scores from a routing application; and
  where the aggregation device, when providing the traffic scores, is to:
    provide the traffic scores to the routing application.
9. The system of claim 1, where the user feedback is received from a routing application.
10. A method, comprising:
  receiving, by an aggregation device and from a processing device, input parameters including vehicle data from a plurality of vehicles traversing a set of road segments,
    the vehicle data being from at least one of:
      a telematics unit,
      a sensor, or
      a global positioning device;
  receiving, by the aggregation device and from the processing device, user feedback from the plurality of vehicles indicating contextual parameters associated with the set of road segments;
  performing, by the aggregation device, analysis on the vehicle data to determine a data element as an outlier;
  determining, by the aggregation device, a relationship between the outlier and at least one of the contextual parameters;
  determine, based on the relationship, an association between the at least one of the contextual parameters and another set of road segments;
  receiving, by the aggregation device, a request for traffic scores associated with a specified contextual parameter,
    the specified contextual parameter being indicative of a quality preference for routing over segments of geographic mapping data; and
  sending, by the aggregation device to a device associated with a vehicle, information indicative of quality of the segments of geographic mapping data to generate a suggested route,
    the information being based on the relationship and the association,
    the segments of geographic mapping data being weighed according to traffic score information indicative of a presence of the specified contextual parameter, and
    the suggested route being provided, for display, at the device associated with the vehicle.
11. The method of claim 10, where the quality preference for routing over the segments of geographic mapping data includes being at least one of:
  more enjoyable,
  more scenic,
  more exciting,
  having less stop and go traffic, or
  having a lower historical rate of vehicle accident.
12. The method of claim 10, where the specified contextual parameter is at least one of:
  included in a route request, or
  retrieved from routing preferences associated with a user of a routing application.
13. The method of claim 10,
  where the suggested route is provided, for display on a map,
    the map including indications of the quality of the segments of geographic mapping data along the suggested route.
14. The method of claim 10, where the suggested route is determined according to at least one of:
  Dijkstra's algorithm, or
  A* algorithm.
15. The method of claim 10, where receiving the request for the traffic scores includes:
  receiving the request for the traffic scores from the processing device,
    the processing device running a routing application.
16. A non-transitory computer-readable medium storing instructions, the instructions comprising:
  a plurality of instructions that, when executed by a processor of an aggregation device, cause the processor to:
    receive input parameters including vehicle data from at least one vehicle traversing at least a first set of road segments and a second set of road segments,
      the vehicle data including at least one of:
        a telematics unit,
        a sensor, or
        a global positioning system device;
    receive user feedback from the at least one vehicle indicating a first contextual parameter associated with the first set of road segments;
    perform analysis on the vehicle data to determine a data element as an outlier;
    determine a relationship between the outlier and the first contextual parameter;
    determine, based on the relationship, an association between a second contextual parameter and the second set of road segments;
    receive a request for traffic score information associated with a specified contextual parameter,
      the specified contextual parameter being indicative of a quality preference for routing over segments of geographic mapping data, generate the traffic score information based on the specified contextual parameter, the relationship, and the association; and provide, to a device associated with a vehicle, the traffic score information to generate a suggested route,
the segments of geographic mapping data being weighed according to the traffic score information, and
the suggested route being provided, for display, at the device associated with the vehicle.

17. The non-transitory computer-readable medium of claim 16, where the plurality of instructions, when executed by the processor, further cause the processor to:
perform at least one heuristic learning technique on the vehicle data to infer presence data element indicative of the first contextual parameter.

18. The non-transitory computer-readable medium of claim 16,
where
the user feedback is associated with at least one of a request for:
a more enjoyable route,
a more scenic route,
a hilly route,
a route with a lower chance of getting into an accident, or
a longer route with less stop-and-go traffic.

19. The non-transitory computer-readable medium of claim 16, where the traffic score information is first traffic score information; and
where the plurality of instructions, when executed by the processor, further cause the processor to:
receive, from a routing application, another request including another contextual parameter;
generate second traffic score information, indicative of a presence of the other contextual parameter over another set of road segments; and
provide the second traffic score information to the routing application.

20. The non-transitory computer-readable medium of claim 16, where the device, associated with the vehicle, is embedded in the at least one vehicle or is a mobile device that is carried by an occupant of the vehicle.

\* \* \* \* \*